United States Patent

[11] 3,584,774

| [72] | Inventor | Tatsusuke Kadowaki<br>Yokohama-shi, Japan |
|---|---|---|
| [21] | Appl. No. | 860,252 |
| [22] | Filed | Sept. 23, 1969 |
| [45] | Patented | June 15, 1971 |
| [73] | Assignee | Kabushiki Kiashi Ricoh<br>Yokyo, Japan |
| [32] | Priority | Sept. 27, 1968 |
| [33] | | Japan |
| [31] | | 43/84589 |

[54] FILM PULL-DOWN MECHANISM FOR PROJECTORS
1 Claim, 3 Drawing Figs.

[52] U.S. Cl. .................................................. 226/62, 352/194
[51] Int. Cl. .................................................. G03b 1/22
[50] Field of Search .................................................. 226/62, 64, 65, 67, 70—72; 352/194, 195

[56] References Cited
UNITED STATES PATENTS

| 2,173,230 | 9/1939 | Kellogg | 352/194 X |
| 3,212,840 | 10/1965 | Roman | 226/62 X |

*Primary Examiner*—Richard A. Schacher
*Attorney*—Burgess, Ryan and Hicks

ABSTRACT: A film pulldown mechanism for projectors wherein a film pulldown plate which is vertically reciprocated in synchronism with the rotation of a shutter rotating shaft is rocked about a line at a right angle relative to the axis of said vertical reciprocal movement thereof by a contact element or cam follower which is made in contact with the cam surface of one of cams each rotating at a different speed in response to the rotation of the shutter shaft and which is reciprocated along the axial direction thereof in response to the contour of said cam surface.

In response to the rotation of the selected cam, the number of frames of film pulled down per unit time may be varied and the still projection is possible when the contact element is disengaged from the cams.

Representative FIG.: FIG. 1

PATENTED JUN15 1971 3,584,774

FILM PULL-DOWN MECHANISM FOR PROJECTORS

BACKGROUND OF THE INVENTION

The present invention relates to a cine-projector and more particularly a film pulldown mechanism for projectors.

In the conventional projectors, the adjustment of the projection speed is made by varying the rotation of the main shaft of an electric motor by a variable resistor or the like.

In this case, the rotation of the shutter is also varied, so that the flicker occurs especially when the projection speed is reduced less than 16 frames per second. Furthermore, the shutter must be held stationary by for example a shutter stop mechanism for still projection. However, in some cases, the shutter will be stopped while its shutter blade is cutting off the light to the screen, thus resulting in no projection at all.

In view of the above, one of the objects of the present invention is to eliminate the flickers and the cutting off the light to the screen by the shutter blade in case of still projection by varying in stepwise the projection speed while maintaining the rotation of the shutter at such a speed where no flickers are produced.

Another object of the present invention is to provide a film pulldown mechanism for projectors which can eliminate a variable resistor and a shutter stop mechanism incorporated in a conventional projector.

SUMMARY OF THE INVENTION

According to an embodiment of the present invention, two disc cams each having a cam profile contoured upon one side face thereof and rotating at a different speed each to each in response to the rotation of the shutter are used. The above cam profile is for example one projected portion of the side face by which a contact element or cam follower is made to reciprocate in the axial direction thereof. The cam follower is also in contact with a film pulldown plate which is vertically reciprocated in synchronism with the rotation of the shutter, so that the plate is rocked about the axis at a right angle relative to the axis of the above vertical reciprocating movement of the plate, that is forwardly and backwardly of the film, in response to the reciprocating motion of the cam follower. With each rocking movement of the plate, the film is pulled downwardly from one frame to the next. The cam follower may be so displaced by the operation from the exterior of the projector as to contact with different cams selectively, thereby varying the projection speed. When the cam follower does not contact with any cam, the film is not pulled downwardly so that the still projection is made even when the shutter is rotating. The projection speeds may be varied over a wide range if the number of the cams is increased.

The above and other objects, features and advantages of the present invention will become more apparent from the description of one illustrative embodiment thereof with reference to the accompanying drawing.

DESCRIPTION OF THE PREFERRED EMBODIMENT

Figure 1:
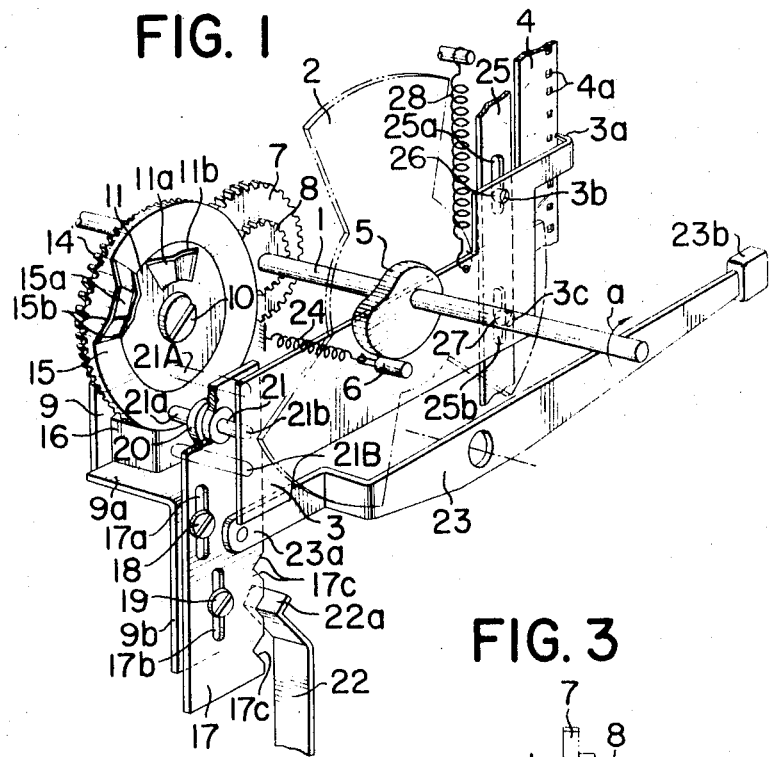
FIG. 1 is a perspective view of a film transport or pulldown mechanism in accordance with the present invention.
Figure 2:
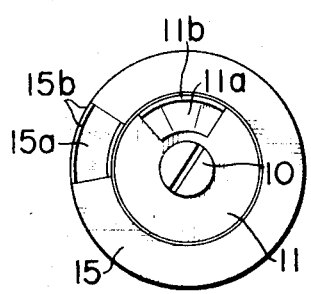
FIG. 2 is an end view of a cam ring used in the mechanism illustrated in FIG. 1.
Figure 3:
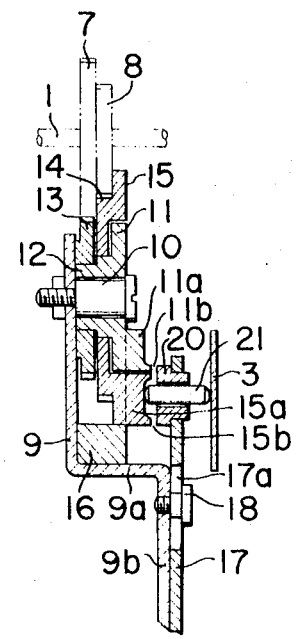
FIG. 3 is a sectional view illustrating the main components of the film transport or pulldown mechanism.

Referring to FIG. 1, reference numeral 1 designates a main shaft; 2, a rotary shutter having three blades; 3, a film transport or pulldown plate having a pulldown pawl 3a for engagement with perforations 4a of film 4; and 5, a cam carried by the main shaft 1 and in engagement with a cam follower 6 fixedly secured to the center portion the plate 3. Gears 7 and 8 are carried by the shaft 1. A support plate 9 is fixedly secured to a stationary member on one side of the main shaft 1 opposite to the film 4 and a shaft 10 is fixed to this plate 9 in parallel with the main shaft 1 and has a stepped shell-shaped member 12 fitted rotatably thereover, said shell-shaped member 12 having an inner cam ring 11 formed integral therewith. A gear 13 in mesh with the gear 7 is fitted over the small diameter portion of the shell-shaped member 12 while a gear 14 is rotatably fitted over the large diameter stepped portion of the shell-like member 12, the gear 14 being in mesh with the gear 8 and having an outer cam ring 15 formed integral therewith. One side faces of the inner and outer cam rings 11 and 15 are disposed in coplanar relation and are provided with projections 11a and 15a respectively. One side edges of the projections 11a and 15a are provided with ridges 11b and 15b respectively as shown in FIG. 2. A stationary member 16 is fixed to the flat bent portion 9a of the support plate 9 so that the upper surface of the stationary member 16 is in coplanar relation with the above-described coplanar side faces of the inner and outer cam rings 11 and 15.

To the depending portion 9b of the support 9 is slidably supporting a contact element or cam follower supporting member 17 having elongated slots 17a and 17b. Screws 18 and 19 loosely extend through these elongated slots 17a and 17b respectively and screwed to the support 9 so that the supporting member 17 may slide in the radial direction of the inner and outer cam rings 11 and 15 within a distance corresponding to the length of the elongated slot 17a or 17b. A tubular shaft 20 is fixed to the upper portion of the supporting member 17 and has a contact element or cam follower 21 loosely fitted thereover. Notches 17c are formed along the side edge of the supporting member 17 on the side of the main shaft 1 and are adapted to engage with an engaging tooth 22a formed at the leading end portion of a resilient member 22 fixed to a stationary member. The inner end 23a of a switch lever 23 having an intermediate portion pivotably fixed to a stationary member is loosely pivoted to the center portion of the supporting member 17. The outer end of the switch lever 23 extends beyond the projector terminating in a knob 23b. The contact element 21 may be selectively made in contact with the above-described side faces of the inner cam ring 11, the outer cam ring 15 or the stationary member 16 by rocking the switch lever 23, and is held in position by the engagement of the tooth or pawl 22a with one of the notches 17c depending upon the above-described selective contact.

A compression spring 24 is fixed to the cam follower 6 of the film transport or pulldown plate 3 so that the latter is normally biased toward the inner and outer cam rings 11 and 15. Small holes 3b and 3c are formed in the end portion on the side of the pulldown pawl 3a of the plate 3 in such a manner that the centers of these small holes 3b and 3c may be aligned along the line at a right angle relative to the main shaft 1. Elongated slots 25a and 25b are formed in a stationary member 25 in opposed relation with the small holes 3b and 3c respectively and balls 26 and 27 are interposed between the small hole 3b and the elongated slot 25a and the small hole 3c and the elongated slot 25b respectively with the parts of these balls being fitted into the holes 3b and 3c and the elongated slots 25a and 25b respectively.

The side edge of the plate 3 opposite from the side of the pulldown pawl 3a is abutted against the end portion 21b of the contact element 21, thereby pressing the same. Thus, it will be seen that the plate 3 is supported by the balls 26 and 27 and the contact element 21. In order to press the cam follower 6 of the plate 3 against the cam 5, a compression spring 28 is fixed to the portion in the vicinity of the pawl 3a of the plate 3. When the main shaft 1 is rotated in the direction indicated by the arrow, the cam 5 is caused to rotate in the same direction so that the plate 3 is reciprocated vertically. The contour of the cam 5 may be designed suitably. The number of teeth of the gear 7 is same as that of the gear 13 and the main shaft 1 is so determined as to rotate at 18 r.p.s., so that both of the gear 13 and the inner cam ring 11 are rotated at 18 r.p.s. The number of teeth of the gear 14 integral with the outer cam ring 15 is three times the number of teeth of the gear 8, so that the gear 14 rotates at 6 r.p.s.

Next the mode of operation will be described. When contacter element 21 is displaced to the position 21A designated by the chain line in FIG. 1 by pushing the knob 23b of the switch lever 23, the end portion 21a of the contact element 21 contacts with the side face of the inner cam ring 11. The plate 3 is rocked about the line connecting the centers of the 26 and 27 because the plate 3 is pushed up and down by the projected portion 11a of the cam ring 11 as the main shafts makes one rotation. Therefore, the pulldown pawl 3a engages with and disengages from the perforation 4a of the film 4 accordingly. Since the projection 11a is so positioned that it may contact with the contact element 21 immediately before the plate 3 is moved downwardly by the cam 5, the pulldown pawl 3a engages with the perforation 4a of the film whenever the main shaft 1 makes one rotation so that the film 4 is pulled downwardly and thereafter the pulldown pawl disengages from the perforation and returns to its initial position for engagement with another perforation. Thus, the film 4 may be transported intermittently at a rate of 18 frames per second. The shutter 2 cuts off the light to the screen between a lamphouse and the gate of the projector head while the film 4 is being moved downwardly from one frame to the next.

When the knob 23b is shifted one step above from its lowermost position described above, the contact element 21 is displaced to the position designated by the solid line in FIG. 1 so that the element 21 contacts with the outer cam ring 15. Since the outer cam ring 15 makes only one rotation each three rotation of the main shaft 1, the projected portion 15a pushes the plate 3 in the counterclockwise direction once each three rotation of the main shaft 1. The projection 15a is so positioned that it may push the plate 3 in the counterclockwise direction immediately before the cam 5 moves the plate 3 downwardly three times after two vertical reciprocating movements thereof. Therefore, the pulldown pawl 3 engages with the perforation 4a of the film 4 immediately before the third downward movement of the plate 3 of the three vertical reciprocating movements thereof so that the film 4 is pulled downwardly. Thus, it will be seen that the film 4 is transported at a rate of 6 frames per second. In this case, the shutter also cuts off the light to the screen while the film is being moved from one frame to the next since it has three shutter blades which ensure the light cutting off operation thereof in synchronism with the movement of the pulldown plate 3.

When the knob 23a of the switch lever 23 is shifted to the uppermost position, the contact element 21 is displaced to the position designated 21B and indicated by the chain line in FIG. 1 and is made in contact with the stationary member 16. In this case, the plate 3 is not rocked but reciprocated vertically even when the main shaft 1 rotates so that the pulldown pawl 3a also makes only the vertical reciprocating movements. Thus, the pulldown pawl 3a cannot engage with the perforation 4a of the film 4, thus permitting the still projection. So far the main shaft 1 has been described as rotating at 18 r.p.s., but it will be understood that the rotation of the main shaft 1 may be determined as need demand and according to the rotation of the main shaft 1, the number of teeth of each gear and the gear ratio may be determined. Instead of making the contact element 21 in contact with the stationary member 16, it may be made in contact with a planar side face of either of the cam rings or with a planar end face of the shaft 10 for still projection. The ridges 11b and 15b of the projections 11a and 15a are provided in order to ensure the contact element 21 to be positively and securely made in contact with a desired cam ring without being switched to another cam ring while the contact element 21 contacts with the projection 11a or 15a, that is while the pulldown pawl 3a pulls the film 4.

According to the present invention, without employing a variable resistor for varying the speed of a motor, the film projection speed may be varied even during the projection. Furthermore, there is no need for provision of a mechanism for stopping the shutter during the still projection. Thus, the projector can be designed compactly. Since the main shaft or the shutter is continuously rotated, the flicker due to the shutter rotating at a low projection speed can be eliminated and the shutter may be prevented from cutting off the light to the screen in case of the still projection.

I claim:

1. A film pulldown mechanism for projectors comprising a outer and inner cam rings disposed in coaxial relation with each other and in coplanar relation with a plane which is at a right angle relative to a shutter rotating shaft;

means for rotating said outer and inner cam rings at different speeds respectively;

one projection extended from one side face of each of said outer and inner cam rings;

a film pulldown plate disposed in opposed relation with said projections;

an axially movable contact element or cam follower interposed between said pulldown plate and said cam rings and adapted to be pressed against one of said cam rings by said film pulldown plate;

means for displacing said contact element in the radial direction of said cam rings by operation from the exterior of the projector; and means for selectively moving toward and away from the paths of rotation of said cam rings.